United States Patent
Shen et al.

(10) Patent No.: US 7,791,992 B2
(45) Date of Patent: Sep. 7, 2010

(54) METHOD FOR CONTROLLING THE RECORD SPEED OF A MULTI-LAYERED OPTICAL DISC

(75) Inventors: Yung-Chi Shen, Taipei (TW); Ming-Jiou Yu, Taipei (TW)

(73) Assignee: Mediatek Incorporation, Hsin-chu, Taiwan (CN)

(*) Notice: Subject to any disclaimer, the term of this patent is extended or adjusted under 35 U.S.C. 154(b) by 1336 days.

(21) Appl. No.: 11/256,981

(22) Filed: Oct. 25, 2005

(65) Prior Publication Data
US 2006/0245332 A1 Nov. 2, 2006

(30) Foreign Application Priority Data
Apr. 29, 2005 (TW) .............................. 94114030 A

(51) Int. Cl.
*G11B 7/00* (2006.01)
(52) U.S. Cl. .................................. 369/47.14; 369/47.4
(58) Field of Classification Search ................. 369/47.4
See application file for complete search history.

(56) References Cited

U.S. PATENT DOCUMENTS

| | | | | |
|---|---|---|---|---|
| 7,539,100 B2 * | 5/2009 | Kim et al. | ................. | 369/53.17 |
| 2002/0163326 A1* | 11/2002 | Choi et al. | ................. | 324/113 |
| 2002/0191506 A1* | 12/2002 | Okamoto et al. | ........... | 369/47.4 |
| 2003/0081517 A1* | 5/2003 | Kim | ........................ | 369/47.47 |
| 2003/0095482 A1* | 5/2003 | Hung et al. | .............. | 369/47.44 |
| 2005/0007920 A1 | 1/2005 | Kim et al. | | |
| 2005/0058033 A1* | 3/2005 | Ishii et al. | ................. | 369/47.5 |
| 2007/0171790 A1 | 7/2007 | Kim et al. | | |

FOREIGN PATENT DOCUMENTS

EP 1 306 839 A2 5/2003
WO WO-2004/084199 A1 9/2004

* cited by examiner

*Primary Examiner*—Lixi Chow
(74) *Attorney, Agent, or Firm*—Birch, Stewart, Kolasch & Birch, LLP

(57) ABSTRACT

A method for controlling the recording speed of a multi-layered optical disc divides a multi-layered optical disc into a plurality of zones with each zone having a corresponding recording speed. It is then determined which zones need the recording speed to be reduced according to the quality of the optical disc. When the optical drive records data onto an inferior quality zone, it reduces the recording speed to guarantee the reliability of recorded data and enhance recording quality. When the optical drive records data on the next recording layer and has passed the zone that corresponds to the inferior quality zone of the previous recording layer, it increases the recording speed. Thereby the method ensures both quality and efficiency. Furthermore, the recording speed of each subsequent zone of the next recording layer corresponds to the recording speed of each previous zone of the recording layer.

10 Claims, 16 Drawing Sheets

| switching location of the second zone 301 | switching location of the third zone 302 | switching location of the fourth zone 303 | switching location of the fifth zone 304 | switching location of the sixth zone 305 | switching location of the seventh zone 306 | switching location of the eighth zone 307 | switching location of the ninth zone 308 |
|---|---|---|---|---|---|---|---|

| speed of the first zone 2X | speed of the second zone 4X | speed of the third zone 6X | speed of the fourth one 8X | speed of the fifth zone 8X | speed of the sixth zone 8X | speed of the seventh zone 6X | speed of the eighth zone 4X | speed of the ninth zone 2X |
|---|---|---|---|---|---|---|---|---|

FIG. 5

| switching location of the second zone 401 | switching location of the third zone 402 | switching location of the fourth zone 403 | switching location of the fifth zone 404 | switching location of the sixth zone 405 | switching location of the seventh zone 406 | switching location of the eighth zone 407 | switching location of the ninth zone 408 |
|---|---|---|---|---|---|---|---|

| speed of the first zone 2X | speed of the second zone 4X | speed of the third zone 6X | speed of the fourth one 8X | speed of the fifth zone 8X | speed of the sixth zone 8X | speed of the seventh zone 6X | speed of the eighth zone 4X | speed of the ninth zone 2X |
|---|---|---|---|---|---|---|---|---|

FIG. 7

| switching location of the second zone 401 | switching location of the third zone 402 | switching location of the fourth zone 403 | switching location of the fifth zone 404 | switching location of the sixth zone 409 | switching location of the seventh zone 406 | switching location of the eighth zone 407 | switching location of the ninth zone 408 |
|---|---|---|---|---|---|---|---|

| speed of the first zone 2X | speed of the second zone 4X | speed of the third zone 6X | speed of the fourth one 8X | speed of the fifth zone 6X | speed of the sixth zone 6X | speed of the seventh zone 6X | speed of the eighth zone 4X | speed of the ninth zone 2X |
|---|---|---|---|---|---|---|---|---|

FIG. 8

| switching location of the second zone 401 | switching location of the third zone 402 | switching location of the fourth zone 403 | switching location of the fifth zone 404 | switching location of the sixth zone 409 | switching location of the seventh zone 406 | switching location of the eighth zone 407 | switching location of the ninth zone 408 |
|---|---|---|---|---|---|---|---|

| speed of the first zone 2X | speed of the second zone 4X | speed of the third zone 6X | speed of the fourth one 8X | speed of the fifth zone 6X | speed of the sixth zone 6X | speed of the seventh zone 4X | speed of the eighth zone 2X | speed of the ninth zone 2X |
|---|---|---|---|---|---|---|---|---|

FIG. 9

| switching location of the second zone 601 | switching location of the third zone 602 | switching location of the fourth zone 603 | switching location of the fifth zone 604 | switching location of the sixth zone 605 | switching location of the seventh zone 606 | switching location of the eighth zone 607 | switching location of the ninth zone 608 |
|---|---|---|---|---|---|---|---|

| speed of the first zone 2X | speed of the second zone 4X | speed of the third zone 6X | speed of the fourth one 8X | speed of the fifth zone 8X | speed of the sixth zone 8X | speed of the seventh zone 6X | speed of the eighth zone 4X | speed of the ninth zone 2X |
|---|---|---|---|---|---|---|---|---|

FIG. 12

| switching location of the second zone 701 | switching location of the third zone 702 | switching location of the fourth zone 703 | switching location of the fifth zone 704 | switching location of the sixth zone 705 | switching location of the seventh zone 706 | switching location of the eighth zone 707 | switching location of the ninth zone 708 |
|---|---|---|---|---|---|---|---|

| speed of the first zone 2X | speed of the second zone 4X | speed of the third zone 6X | speed of the fourth one 8X | speed of the fifth zone 8X | speed of the sixth zone 8X | speed of the seventh zone 6X | speed of the eighth zone 4X | speed of the ninth zone 2X |
|---|---|---|---|---|---|---|---|---|

FIG. 14

| switching location of the second zone 701 | switching location of the third zone 702 | switching location of the fourth zone 703 | switching location of the fifth zone 704 | switching location of the sixth zone 709 | switching location of the seventh zone 706 | switching location of the eighth zone 707 | switching location of the ninth zone 708 |
|---|---|---|---|---|---|---|---|

| speed of the first zone 2X | speed of the second zone 4X | speed of the third zone 6X | speed of the fourth one 8X | speed of the fifth zone 6X | speed of the sixth zone 6X | speed of the seventh zone 6X | speed of the eighth zone 4X | speed of the ninth zone 2X |
|---|---|---|---|---|---|---|---|---|

FIG. 15

| switching location of the second zone 701 | switching location of the third zone 702 | switching location of the fourth zone 703 | switching location of the fifth zone 704 | switching location of the sixth zone 709 | switching location of the seventh zone 706 | switching location of the eighth zone 707 | switching location of the ninth zone 708 |
|---|---|---|---|---|---|---|---|

| speed of the first zone 2X | speed of the second zone 4X | speed of the third zone 6X | speed of the fourth one 8X | speed of the fifth zone 6X | speed of the sixth zone 6X | speed of the seventh zone 4X | speed of the eighth zone 2X | speed of the ninth zone 2X |
|---|---|---|---|---|---|---|---|---|

FIG. 16

METHOD FOR CONTROLLING THE RECORD SPEED OF A MULTI-LAYERED OPTICAL DISC

BACKGROUND OF THE INVENTION

1. Field of the Invention

The present invention relates to a method for controlling the recording speed of a multi-layered optical disc. In particular, this invention provides a method for deciding the recording speed of each recording layer of a multi-layered optical disc when an optical drive records the information on the disc.

2. Description of the Related Art

The quality of an optical disc influences the reliability of data recorded on the disc. In the manufacturing process of a recordable disc, the physical signal of the disc (such as the wobble signal, the tracking error or the focus error etc.) is not good if the dye on the disc is coated disproportionately or if the disc is warped. This reduces the quality of data recording when data is recorded using a high recording speed on some zones of the disc. This issue usually occurs at the outside area of the disc. Furthermore, in order to store more data, the different kinds of recordable discs can be either monolayered, double-layered to multi-layered. If the number of layers of the recordable disc is higher, the difficulty of manufacturing increases and quality control is harder. As such, there is a large disparity between the quality of discs available on the market. So it's easy to see why guaranteeing data recording quality on a disc is an important issue for an optical drive with a recording function. In the prior art this problem has been dealt with by reducing the recording speed to enhance recording quality.

FIGS. 1A and 1B show a schematic diagram of a double-layered disc of the prior art. FIG. 1A shows a double-layered disc 10 having a first recording layer 12 and a second recording layer 14. The first recording layer 12 and the second recording layer 14 are on a parallel track path (PTP). The recording sequence of the double-layered disc 10 moves from the inner location 121 to the outer location 122 of the first recording layer 12, then from the inner location 141 to the outer location 142 of the second recording layer 14. The arrows in FIG. 1A show the recording direction of the recording layers.

FIG. 1B shows another double-layered disc 16 having a first recording layer 18 and a second recording layer 20. The first recording layer 18 and the second recording layer 20 are on opposite track path (OTP). The recording sequence of the double-layered disc 16 is from the inner location 181 to the outer location 182 of the first recording layer 16, then from the outer location 201 to the inner location 202 of the second recording layer 20. The arrows in FIG. 1B show the recording direction of the recording layers.

FIG. 2 shows a schematic diagram of the relationship between the recording speed and the location of a double-layered disc on opposite track path of the prior art. The first recording layer of the disc is divided into four zones, Z1, Z2, Z3 and Z4. Each zone individually corresponds to one recording speed, such as 2 times speed, 4 times speed, 6 times speed and 8 times speed (2×, 4×, 6× and 8×). Moreover, the second recording layer of the disc is also divided into four zones, Z5, Z6, Z7 and Z8. Each zone also individually corresponds to one recording speed, such as 2 times speed, 4 times speed, 6 times speed and 8 times speed (2×, 4×, 6× and 8×). When an optical drive is recording data on a disc, the optical drive firstly sets the recording speed according to the location of the zones and the corresponding speed. Secondly, when the optical drive records data on the disc from the inner area to the outer area of the first recording layer, the recording speed goes from low speed to high speed. Then, when the optical drive records data on the disc from the outer area to the inner area of the second recording layer; the recording speed goes from high speed to low speed.

When the quality of a zone of the optical disc is inferior, the optical drive reduces the recording speed at the inferior zone of the optical disc in order to guarantee the reliability of the recorded data, as shown in FIG. 3. When the quality of the optical disc is inferior, such as in zone Z3 of the first recording layer of the optical disc, the optical drive reduces the recording speed from 6× to 4× and records data on the rest of the first recording layer and the second recording layer at this speed, 4×. Although this method improves the recording quality, it still uses a low recording speed to record data on the zone of the second recording layer even though it is suitable for using a high recording speed. The recording time is therefore longer and the efficiency becomes lower. As such the method does not ensure both quality and efficiency.

SUMMARY OF THE INVENTION

One particular aspect of the present invention is to provide a method for controlling the recording speed of a multi-layered optical disc. This method divides a multi-layered optical disc into a plurality of zones and each zone has a corresponding recording speed. Then, this method decides which zones need to have the recording speed reduced according to the quality of the zone. When the optical drive records data onto a zone with inferior quality, it reduces the recording speed to guarantee the reliability of the recorded data and enhance the recording quality. When the optical drive records data onto the next recording layer and passes the zone that corresponds to the zone of the previous recording layer with inferior quality, it increases the recording speed. As such, this method shortens recording time and increases recording efficiency. It ensures both quality and efficiency.

Another particular aspect of the present invention is to provide a method for controlling the recording speed of a multi-layered optical disc. This method divides a multi-layered optical disc into a plurality of zones with each zone having a corresponding recording speed. The recording speed of each zone of the next recording layer corresponds to the recording speed of each zone of the previous recording layer. When an optical drive records data onto each recording layer, it can refer to the recording speed and quality of the previous recording layer and determine the recording speed of the next recording layer.

A further particular aspect of the present invention is to provide a method for controlling the recording speed of a multi-layered optical disc. This method divides a multi-layered optical disc into a plurality of zones and each zone has a corresponding recording speed. When an optical drive records data on one recording layer, this method modifies the pre-setting location and recording speed of each zone of the multi-layered optical disc according to the quality of the present recording layer. This method has the function of learning and the amended location and recording speed of zones can be provided to the next recording layer for recording data.

The present invention provides a method for controlling the recording speed of a multi-layered optical disc. A multi-layered optical disc has a plurality of recording layers and each recording layer is on an opposite track path (OTP). The steps of the present method include: dividing the multi-layered disc into a plurality of zones from inner to outer, wherein the location of each zone of each recording layer corresponds to each other; detecting the quality of each zone of the multi-layered disc; setting the recording speed of each zone according to the quality of each zone; and recording data on the multi-layered disc using an predetermined recording speed for each zone. When an optical drive records data on a zone with inferior quality, it reduces the recording speed. After the optical drive reduces the recording speed of a recording layer recording from the inside to the outside, the optical drive records data onto the next recording layer from the outside to the inside and passes the zone that corresponds to the zone of the previous recording layer with inferior quality, it increases the recording speed when the recording speed of the next zone is larger than the zone with inferior quality. Thereby, this method shortens recording time and increases recording efficiency.

The present invention provides a method for controlling the recording speed of a multi-layered optical disc. A multi-layered optical disc has a plurality of recording layers and each recording layer is on a parallel track path (PTP). The steps of the present method include: dividing the multi-layered disc into a plurality of zones from inner to outer, wherein the location of each zone of each recording layer corresponds to each other; detecting the quality of each zone of the multi-layered disc; setting the recording speed of each zone according to the quality of zones; and recording data onto the multi-layered disc by a predetermined recording speed for each zone. When an optical drive records data onto a zone with inferior quality, it reduces the recording speed. Then, the optical drive records data onto the next recording layer from the outside to the inside according to the location, the recording speed of the zone of the previous recording layer and the quality of the present recording layer.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows:

FIG. 5 is a schematic diagram of the recording speed and location of zones of the first embodiment of a method for controlling the recording speed of a multi-layered optical disc of the present invention;

FIG. 7 is a schematic diagram of the recording speed and location of zones of the second embodiment of a method for controlling the recording speed of a multi-layered optical disc of the present invention;

FIG. 8 is another schematic diagram of the recording speed and location of zones of the second embodiment of a method for controlling the recording speed of a multi-layered optical disc of the present invention;

FIG. 9 is further schematic diagram of the recording speed and location of zones of the second embodiment of a method for controlling the recording speed of a multi-layered optical disc of the present invention;

FIG. 12 is a schematic diagram of the recording speed and location of zones of the fourth embodiment of a method for controlling the recording speed of a multi-layered optical disc of the present invention;

FIG. 14 is a schematic diagram of the recording speed and location of zones of the fifth embodiment of a method for controlling the recording speed of a multi-layered optical disc of the present invention;

FIG. 15 is another schematic diagram of the recording speed and location of zones of the fifth embodiment of a method for controlling the recording speed of a multi-layered optical disc of the present invention;

FIG. 16 is further schematic diagram of the recording speed and location of zones of the fifth embodiment of a method for controlling the recording speed of a multi-layered optical disc of the present invention.

DETAILED DESCRIPTION OF THE PREFERRED EMBODIMENTS

Figure 1A:
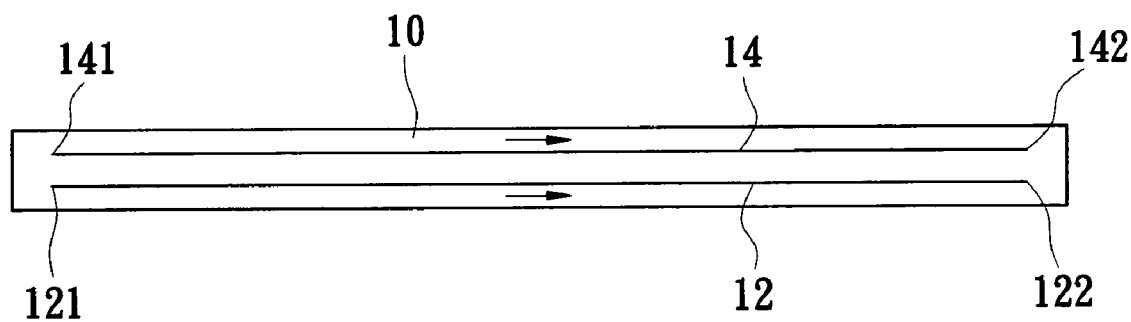
FIG. 1A is a schematic diagram of a double-layered disc of the prior art.
Figure 1B:
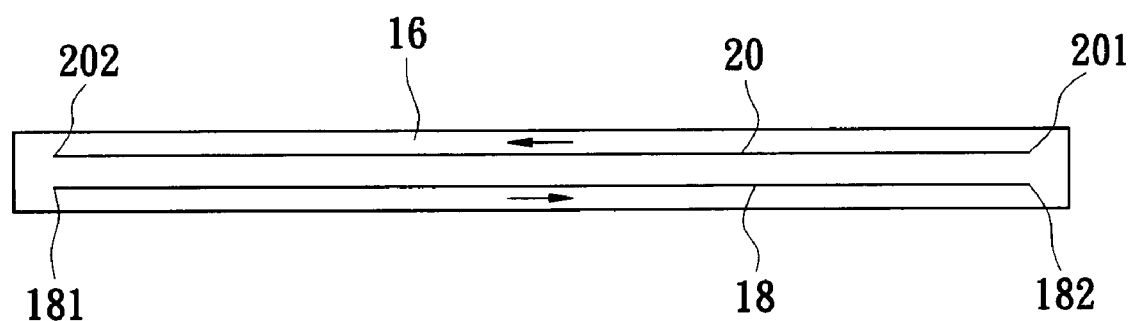
FIG. 1B is another schematic diagram of a double-layered disc of the prior art.
Figure 2:
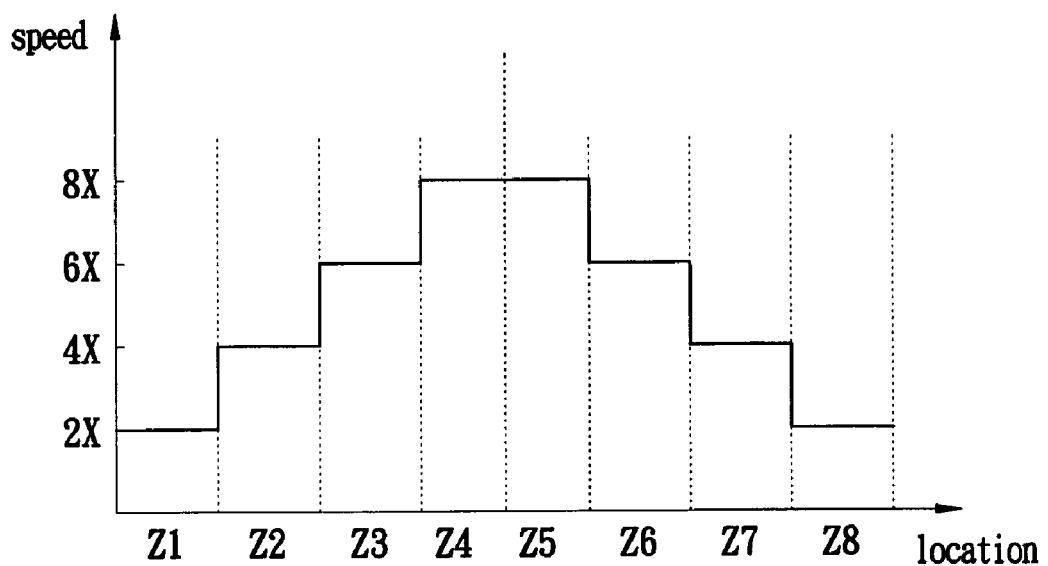
FIG. 2 is a schematic diagram of a relationship between the recording speed and the location of a double-layered disc on an opposite track path of the prior art.
Figure 3:
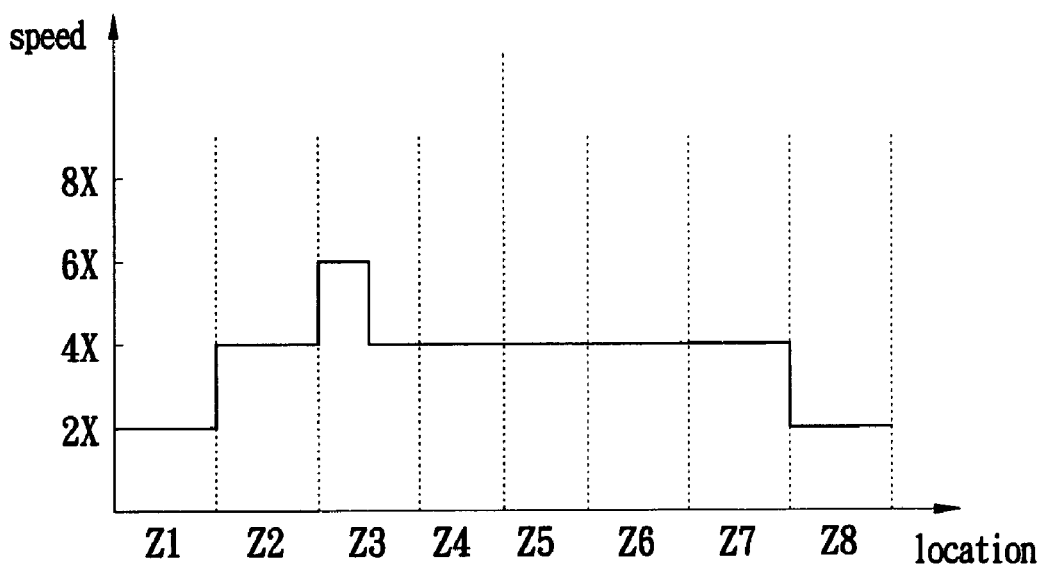
FIG. 3 is a schematic diagram of recording speeds of a double-layered disc on an opposite track path with inferior quality of the prior art.
Figure 4:
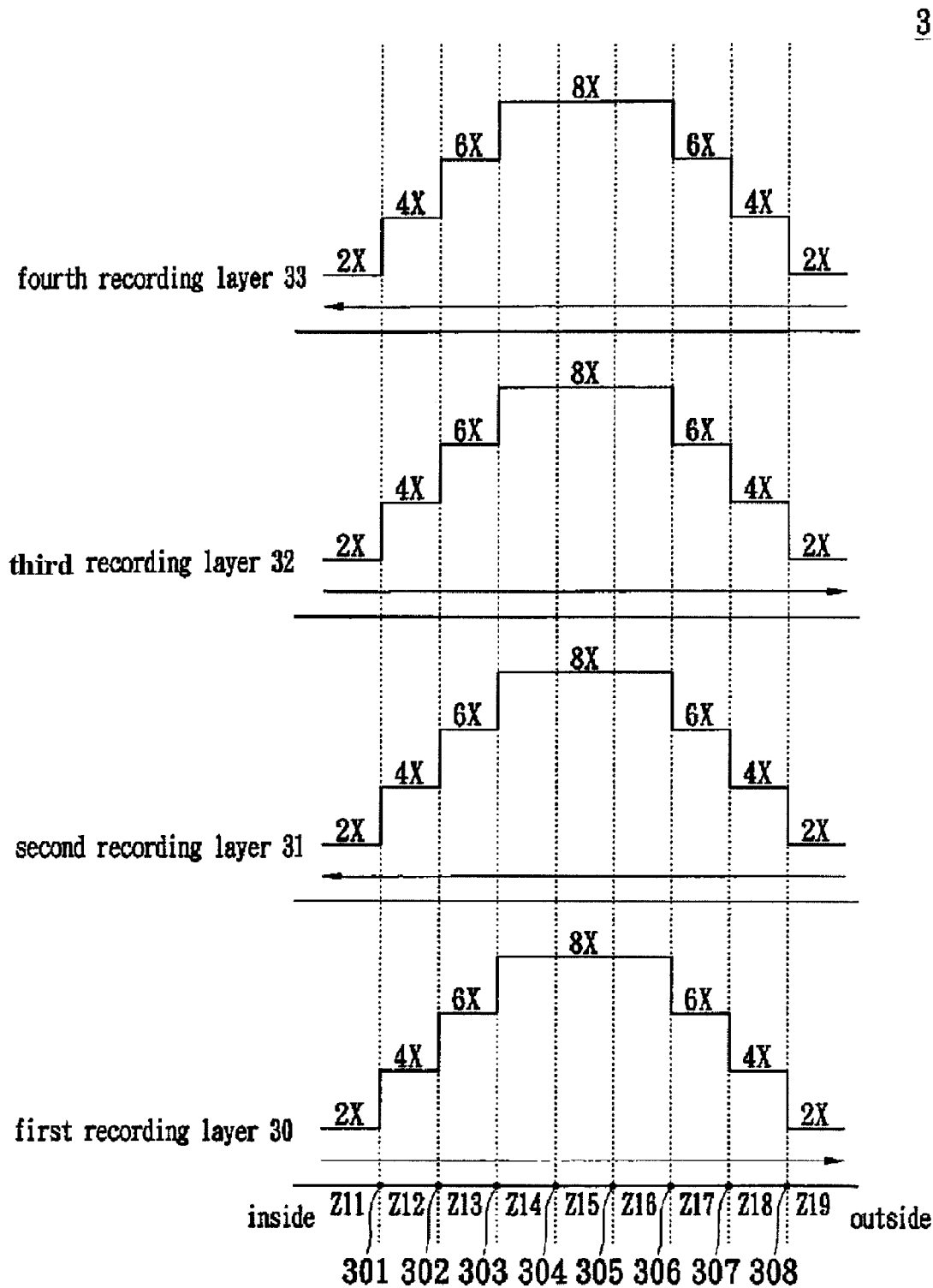
FIG. 4 is a schematic diagram of the first embodiment of a method for controlling the recording speed of a multi-layered optical disc of the present invention.

Please refer to FIG. 4, which shows a schematic diagram of the first embodiment of a method for controlling the recording speed of a multi-layered optical disc of the present invention. The present embodiment uses as an example a multi-layered disc 3 with four recording layers—a first recording layer 30, a second recording layer 31, a third recording layer 32 and a fourth recording layer 33. The arrow direction in FIG. 4 shows the recording direction of each recording layer. Each recording layer of the multi-layered disc is on an opposite track path (OTP). The present embodiment with four recording layers is used as an example, and is not limited to discs with four layers. A two-layered disc or a disc with more than two layers may also be used. Before recording, the method divides the multi-layered disc into a plurality of zones from the inside to the outside. The present embodiment divides the disc into nine zones. There is a first zone Z11, a second zone Z12, a third zone Z13, a fourth zone Z14, a fifth zone Z15, a sixth zone Z16, a seventh zone Z17, a eighth zone Z18 and a ninth zone Z19. The number of zones is at least two.

Next, an optical drive moves a PUH (pick-up head) to these zones and determines the quality of the signals. The signals include a peak value of a tracking error (TE), a peak value of a focus error (FE) and a jitter of wobble signals. When the optical drive receives an inferior signal from some zones, it reduces the recording speed for those zones. The quality of a disc also can be determined by the identification (ID) of a manufacturer or the dye of the disc.

When, after the optical drive has determined the quality of the disc, and found the quality of each recording layer of the multi-layered disc of the present embodiment to be similar, the optical disc drive finds that the seventh zone Z17, the eighth zone Z18 and the ninth zone Z19 have inferior quality, the method reduces the recording speed appropriately. Furthermore, the optical drive reserves two zones to store the recording speed and the switching location of each zone. As shown in FIG. 5, the recording speeds are 2×, 4×, 6×, 8×, 8×, 8×, 6×, 4× and 2×. The switching locations are 301, 302, 303, 304, 305, 306, 307 and 308.

When an optical drive records data onto the multi-layered disc, it firstly records data onto the first recording layer 30 from the inside to the outside according to the above recording speeds and zones. Next, the drive records data onto the second recording layer 31 from the outside to the inside. When the optical drive passes the zone with inferior quality and the recording speed of the next zone is larger than the present recording speed, it increases the recording speed to shorten the recording time. For example, the recording speed increases from 2× to 4× when the optical drive records data onto the second recording layer 31 as it switches from the ninth zone Z9 to the eighth zone Z8. Using this rule, the optical drive records data onto the third recording layer 32 and the fourth recording layer 33. The recording speed of the present embodiment is used as an example, not to limit its type or speed.

Figure 6:
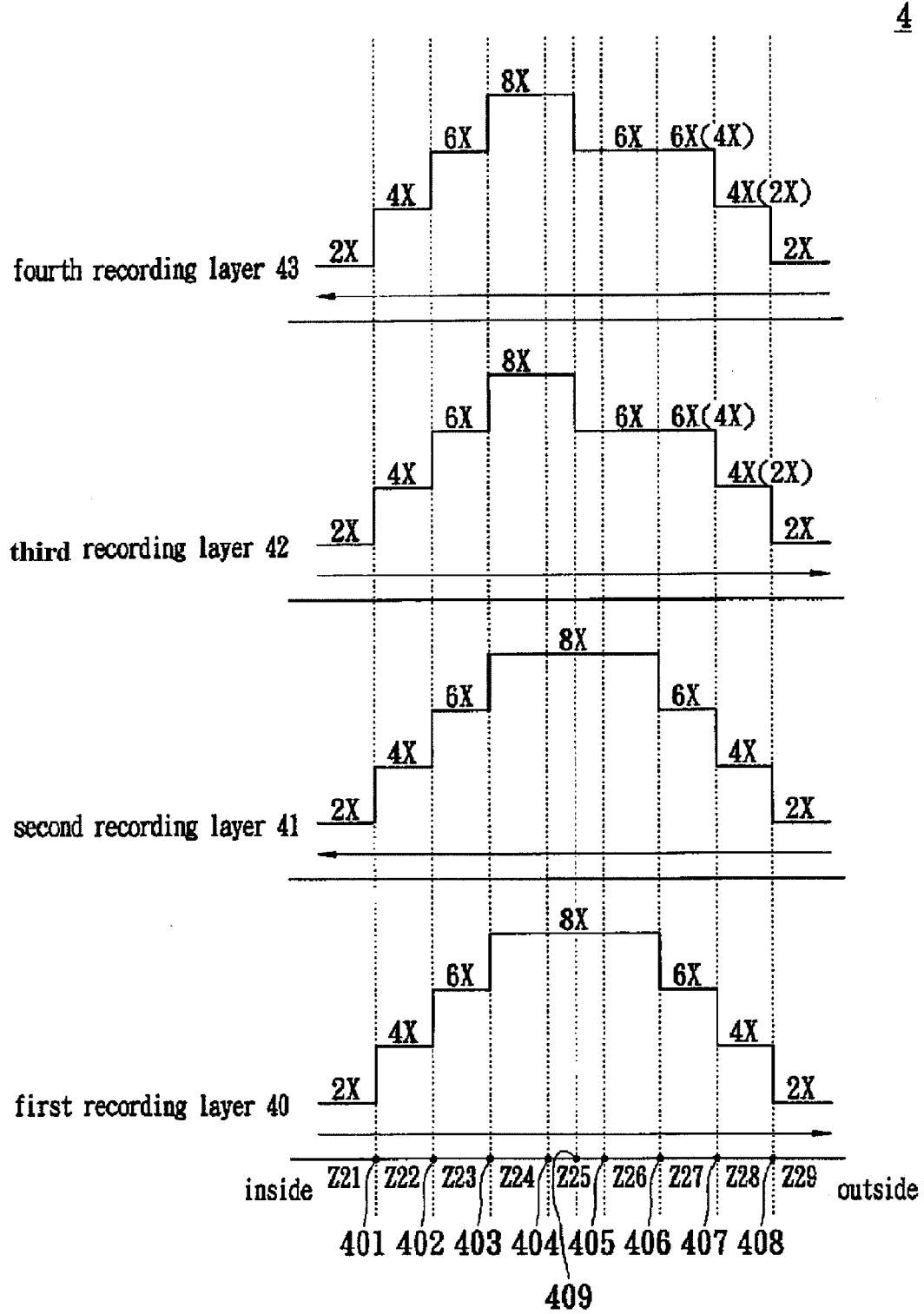
FIG. 6 is a schematic diagram of the second embodiment of a method for controlling the recording speed of a multi-layered optical disc of the present invention.

Please refer to FIG. 6, which shows a schematic diagram of the second embodiment of a method for controlling the recording speed of a multi-layered optical disc of the present invention. The present embodiment is a multi-layered disc 4 with four recording layers—a first recording layer 40, a second recording layer 41, a third recording layer 42 and a fourth recording layer 43. The arrow direction in FIG. 6 shows the recording direction of each recording layer. Each recording layer of the multi-layered disc is on an opposite track path (OTP). Before recording, the method divides the multi-layered disc into a plurality of zones from the inside to the outside. The present embodiment divides the disc into nine zones. There is a first zone Z21, a second zone Z22, a third zone Z23, a fourth zone Z24, a fifth zone Z25, a sixth zone Z26, a seventh zone Z27, a eighth zone Z28 and a ninth zone Z29.

Next, an optical drive moves the PUH (pick-up head) to these zones and determines the quality of the signals. The signals include a peak value of tracking error (TE), a peak value of focus error (FE) and a jitter of wobble signals. When the optical drive obtains an inferior signal at some zones, it reduces the recording speed of the zones.

When, after the optical drive has determined the quality of the disc, and found the quality of the first recording layer 40 and the second recording layer 41 of the multi-layered disc of the present embodiment to be similar, but has determined that the seventh zone Z27, the eighth zone Z28 and the ninth zone Z29, have inferior quality, the method reduces the recording speed appropriately. At the fifth zone Z25 of the third recording layer 42, the optical drive detects an inferior signal and needs to reduce the recording speed. Therefore, it modifies the switching location of the fifth zone Z5 to 409. Furthermore, the optical drive reserves two zones to store the recording speed and the switching location of each zone. As shown in FIG. 7, for the first recording layer 40, the recording speeds are 2×, 4×, 6×, 8×, 8×, 8×, 6×, 4× and 2×. The switching locations are 301, 302, 303, 304, 305, 306, 307 and 308. The second recording layer 41 uses the same recording speed and the same switching location because the quality of the second recording layer 41 is similar to the first recording layer 40.

At the fifth zone Z25 of the third recording layer 42, the recording speed needs to be reduced because the quality is inferior. As such, the optical drive needs to learn and modify the recording speed and the switching location of each zone for the third recording layer. As shown in FIG. 8, the speeds are 2×, 4×, 6×, 8×, 6×, 6×, 6×, 4× and 2×; the switching locations of each zone are 401, 402, 403, 404, 409, 406, 407 and 408. Of course, the optical drive can reduce the recording speed by one more level. As shown in FIG. 9, the speeds are 2×, 4×, 6×, 8×, 6×, 6×, 4×, 2× and 2× and the switching locations of each zone are 401, 402, 403, 404, 409, 406, 407 and 408. The fourth recording layer 43 uses the same recording speed and the same switching location because the quality of the fourth recording layer 43 is similar to the third recording layer 42.

In the recording process, a new switching location is added so that the speed of the optical drive changes when it encounters an inferior quality zone, such as the third recording layer 42 as shown in FIG. 6. In the present invention however, the recording speed is reduced due to the inferior signals. As shown in FIG. 6, a switching location 409 replaces a switching location 405 thereby reducing the recording speed in the third recording layer 42 and the fourth recording layer 43. In other words, the method of the present invention modifies the switching location of the fifth zone Z5 from 404 to 405. Therefore, the optical drive doesn't need to add a new switching location for changing the optical drive's speed. The method reduces the recording speed by one more level to ensure recording quality, as shown in the parentheses of FIG. 6. It reduces the recording speed at the switching location until the lowest speed, such as 2×. The fourth recording layer 43 uses the same recording speed and the same switching location of the third recording layer 42.

When an optical drive records data onto the multi-layered disc, it firstly records data onto the first recording layer 40 from the inside to the outside according to the above recording speeds and zones. Next, the drive records data onto the second recording layer 41 from the outside to the inside. When the optical drive passes the zone with inferior quality and the recording speed of the next zone is larger than the present recording speed, it increases the recording speed to shorten the recording time. For example, the recording speed increases from 2× to 4× when the optical drive records data onto the second recording layer 41 when switching from the ninth zone Z9 to the eighth zone Z8. At the third recording layer 42, there exists a zone with inferior quality and the recording speed needs to be reduced. The method modifies the recording speed and the switching location and stores them up. The optical drive records data onto the third recording layer 42 according to the recording speeds and the zones shown in FIG. 8 or FIG. 9. The fourth recording layer 43 uses the same recording speed and the same switching location because the quality of the fourth recording layer 43 is similar to the third recording layer 42.

The recording process refers to the first recording layer, the second recording layer, the third recording layer and the fourth recording layer either in sequence or not. The method of the present invention uses the recording speed and zones of the present recording layer for the next recording layer to guarantee recording quality.

From the above embodiments, the method for controlling the recording speed of a multi-layered optical disc of the present invention has a corresponding relationship to the recording speed and the zones between each recording layer. It also reduces the recording speed for a zone with inferior quality and increases the recording speed for the next recording layer after the optical drive passes the zone with inferior quality and the recording speed of the zone is larger than the present recording speed. The method of the present invention can shorten the recording time and increase recording efficiency. Furthermore, the method modifies the recording speeds and the zones of each recording layer according to the quality of the disc in the recording process and provides the amended recording speeds and the zones for the next recording layer.

Figure 10:
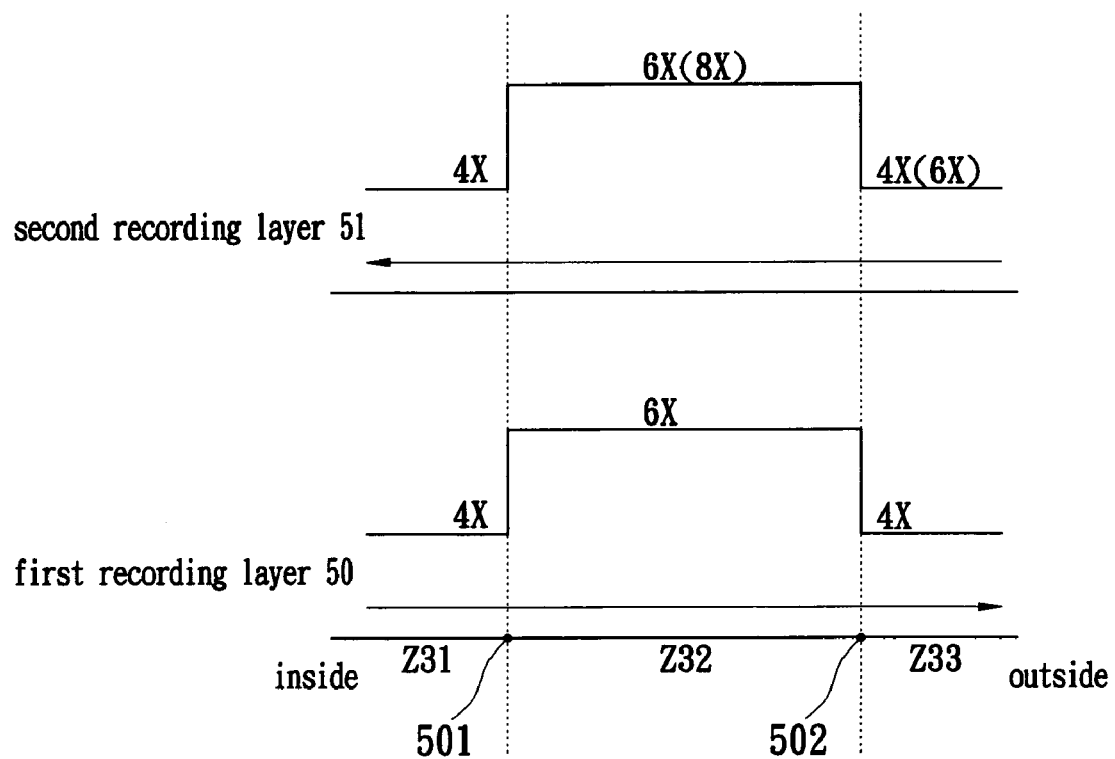
FIG. 10 is a schematic diagram of the third embodiment of a method for controlling the recording speed of a multi-layered optical disc of the present invention.

Because the inferior signal of the disc usually occurs at the outside of the disc, the optical drive is able to simplify the detection method. The present method maps out a zone located at the outside of the disc for reducing the recording speed. Before recording data, the optical drive moves the PUH to the outside of the disc and executes an OPC (optimum power calibration) to detect the quality of the signals. FIG. 10 shows a schematic diagram of the third embodiment of a method for controlling the recording speed of a multi-layered optical disc of the present invention. The present embodiment is a multi-layered disc 4 with two recording layers—a first recording layer 50 and a second recording layer 51. The arrow direction in FIG. 10 shows the recording direction of each recording layer. Each recording layer of the multi-layered disc is on an opposite track path (OTP). Before recording, the method divides the multi-layered disc into a plurality of zones from the inside to the outside. The present embodiment divides the disc into three zones. There is a first zone Z31, a second zone Z32 and a third zone Z33. Only the third zone Z33 located at the outside of the disc is the location on a disc where the recording speed usually needs to be reduced because the quality of the signals is inferior.

After completing recording on the first recording layer 50, the PUH jumps to the second recording layer 51 and the switching locations of the zones of the second recording layer 51 refer to the switching locations of the previous recording layer, such as the switching locations of the zones of the second recording layer 51. Taking a dual-layer DVD disc as an example, the addresses of the related location of the first recording layer 50 and the second recording layer 51 are opposite. If the address on the first recording layer 50 is 0x30000, the address of the related location of the second recording layer 51 is 0xFCFFFF. The switching location can be either fixed-point or one point with an adjustable range. The optical drive reduces the recording speed on the switching location 502 when recording data onto the first recording layer 50 from the inside to the outside and increases the recording speed on the switching location 502 when recording data onto the second recording layer 51 from the outside to the inside. As showed in FIG. 10, the recording speeds on the first recording layer 50 are 4×, 6× and 4× from the inside to the outside, and are 4×, 6× and 4× on the second recording layer 51 from the outside to the inside.

Of course, the optical drive can increases the recoding speed when the quality of the recording layer is superior to the previous recording layer. But the zones still refer to the previous recording layer. So, when the quality of the second recording layer 51 is superior to the first recording layer 50, the recording speeds are 6×, 8× and 4× from the outside to the inside as shown in the parentheses of FIG. 10.

Figure 11:
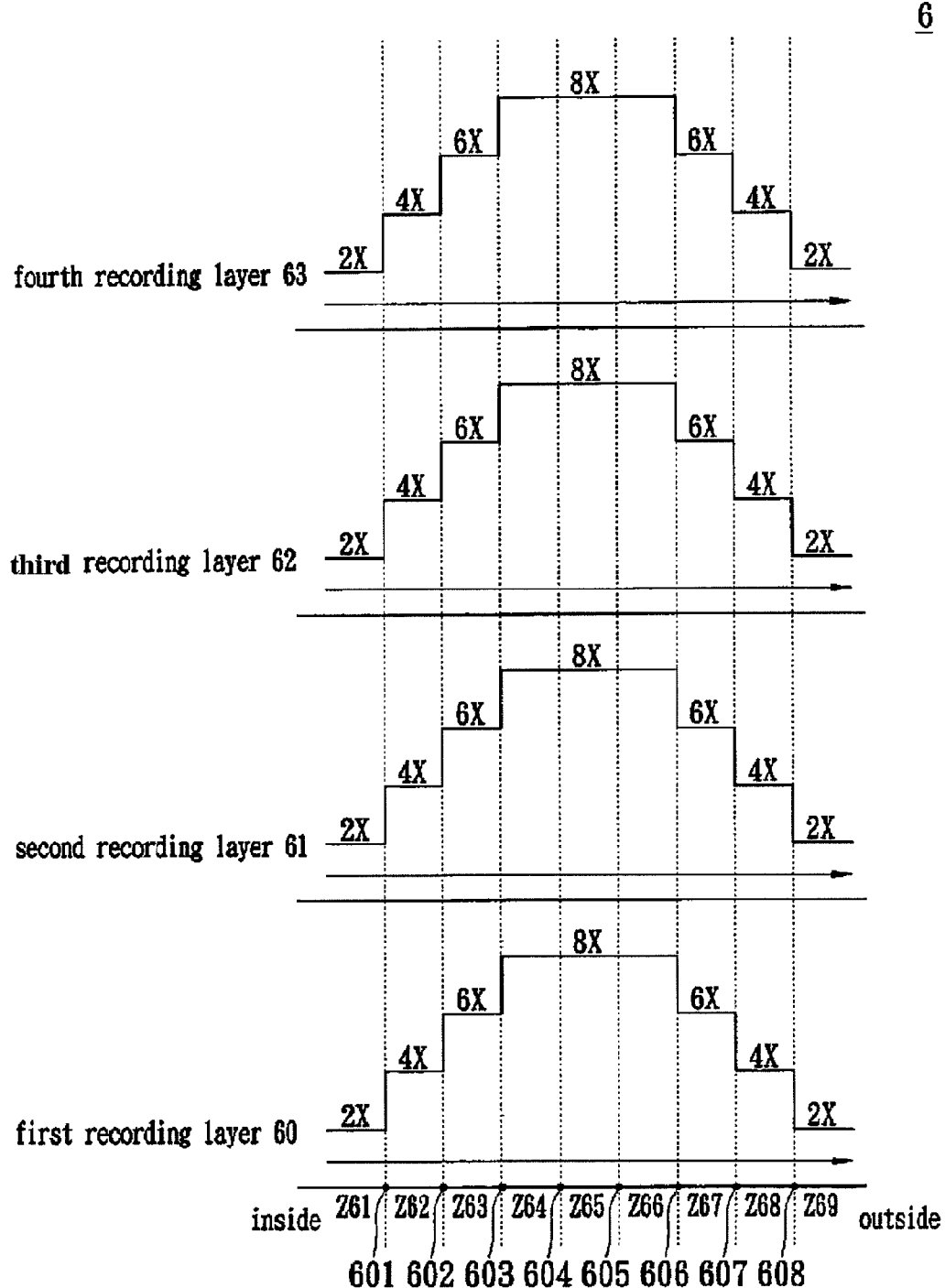
FIG. 11 is a schematic diagram of the fourth embodiment of a method for controlling the recording speed of a multi-layered optical disc of the present invention.

Please refer to FIG. 11, which shows a schematic diagram of the fourth embodiment of a method for controlling the recording speed of a multi-layered optical disc of the present invention. The present embodiment is a multi-layered disc 6 with four recording layers—a first recording layer 60, a second recording layer 61, a third recording layer 62 and a fourth recording layer 63. Each recording layer of the multi-layered disc is on a parallel track path (PTP). Before recording, the method divides the multi-layered disc into a plurality of zones from the inside to the outside. The present embodiment divides the disc into nine zones. There is a first zone Z61, a second zone Z62, a third zone Z63, a fourth zone Z64, a fifth zone Z65, a sixth zone Z66, a seventh zone Z67, a eighth zone Z68, and a ninth zone Z69. The switching locations are 601, 602, 603, 604, 605, 606, 607 and 608.

Then, the optical drive moves the PUH (pick-up head) to these zones and determines the quality of the signals, including a peak value of tracking error (TE), a peak value of focus error (FE) and a jitter of wobble signals. When the optical drive obtains an inferior signal at some zones, it reduces the recording speed of the zones. The quality of a disc also can be determined by the identification (ID) of a manufacturer or the dye of the disc.

After the optical drive determines the quality of the disc, the quality of each recording layer of the multi-layered disc of the present embodiment is similar. At the seventh zone Z67, the eighth zone Z68 and the ninth zone Z69, the quality is inferior. As such, the method reduces the recording speed. Furthermore, the optical drive reserves two zones to store the recording speed and the switching location of each zone. As shown in FIG. 12, the recording speeds are 2×, 4×, 6×, 8×, 8×, 8×, 6×, 4× and 2×. The switching locations are 601, 602, 603, 604, 605, 606, 607 and 608.

When an optical drive records data onto the multi-layered disc, it records data onto the each recording layer—including the first recording layer 60, the second recording layer 61, the third recording layer 62 and the fourth recording layer 63, from the inside to the outside according to the above recording speeds and zones. Next, the drive records data onto the second recording layer 31 from the inside to the outside.

Figure 13:
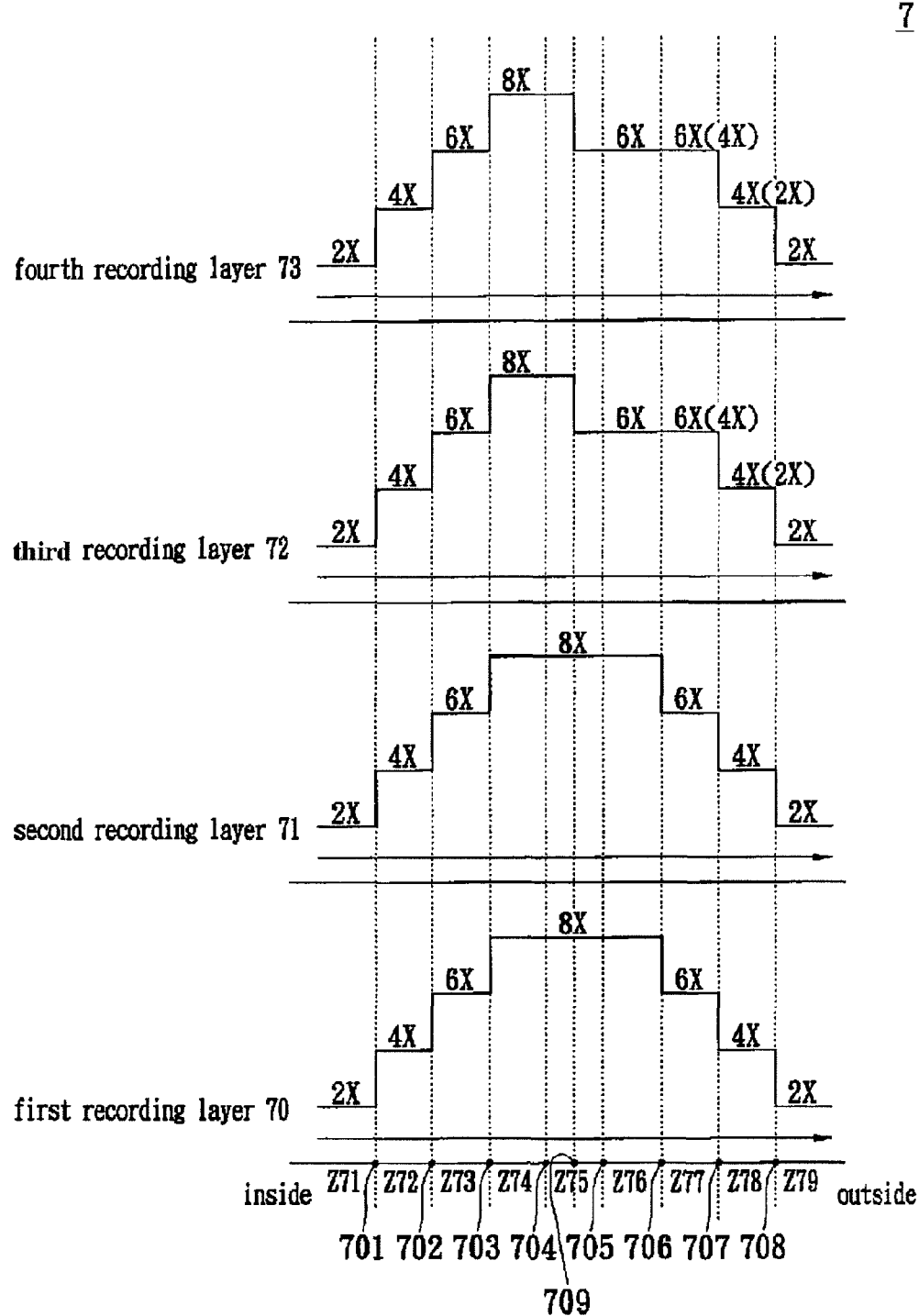
FIG. 13 is a schematic diagram of the fifth embodiment of a method for controlling the recording speed of a multi-layered optical disc of the present invention.

Please refer to FIG. 13, which shows a schematic diagram of the fifth embodiment of a method for controlling the recording speed of a multi-layered optical disc of the present invention. The present embodiment is a multi-layered disc 7 with four recording layers—a first recording layer 70, a second recording layer 71, a third recording layer 72 and a fourth recording layer 73 and each recording layer of the multi-layered disc is on an parallel track path (PTP). Before recording, the present embodiment divides the disc into nine zones from the inside to the outside. There is a first zone Z71, a second zone Z72, a third zone Z73, a fourth zone Z74, a fifth zone Z75, a sixth zone Z76, a seventh zone Z77, a eighth zone Z78 and a ninth zone Z79. The switching locations are 701, 702, 703, 704, 705, 706, 707 and 708.

Next, the optical drive moves the PUH (pick-up head) to these zones and determines the quality of the signals. After the optical drive determines the quality of the disc, the quality of the first recording layer 70 and the second recording layer 71 of the multi-layered disc of the present embodiment are similar. At the seventh zone Z77, the eighth zone Z78 and the ninth zone Z79, the quality is inferior. As such, the method reduces the recording speed. At the fifth zone Z75 of the third recording layer 72, the optical drive detects an inferior signal and needs to reduce the recording speed. Therefore, it modifies the switching location of the fifth zone Z75 to 709. As shown in FIG. 14, for the first recording layer 70, the recording speeds are 2×, 4×, 6×, 8×, 8×, 8×, 6×, 4× and 2×. The switching locations are 701, 702, 703, 704, 705, 706, 707 and 708. The second recording layer 71 uses the same recording speed and the same switching location because the quality of the second recording layer 71 is similar to the first recording layer 70.

At the fifth zone Z75 of the third recording layer 72, the recording speed needs to be reduced because the quality is inferior. As such, the optical drive needs to establish and modify the recording speed and the switching location of each zone for the third recording layer. As shown in FIG. 15, the speeds are 2×, 4×, 6×, 8×, 6×, 6×, 6×, 4× and 2×; the switching locations of each zone are 701, 702, 703, 704, 709, 706, 707 and 708. Alternatively, the optical drive can reduce the recording speed by one more level. As shown in FIG. 16, the speeds are 2×, 4×, 6×, 8×, 6×, 6×, 4×, 2× and 2× and the switching locations of each zone are 701, 702, 703, 704, 709, 706, 707 and 708. The fourth recording layer 73 uses the same recording speed and the same switching location.

When the optical drive records data onto the multi-layered disc, firstly it records data onto the first recording layer 70 and the second recording layer 71 from the inside to the outside according to the above recording speeds and zones. When the optical drive passes the inferior quality zone and the recording speed of the next zone is larger than the present recording speed, it increases the recording speed to shorten the recording time. For example, the optical drive records data onto the third recording layer 72 and the fourth recording layer 73 according to the recording speeds and the zones shown in FIG. 15 or FIG. 16.

Figure 17:
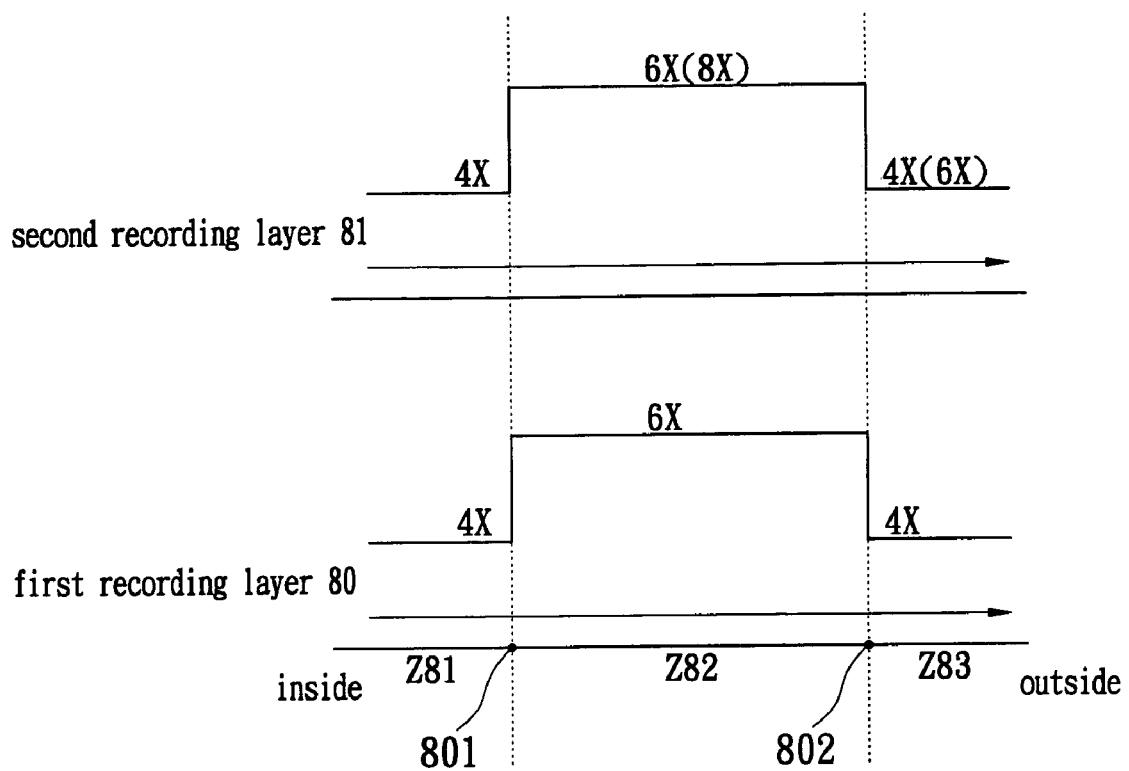
FIG. 17 is a schematic diagram of the sixth embodiment of a method for controlling the recording speed of a multi-layered optical disc of the present invention.

Because the inferior signal of the disc usually occurs at the outside of the disc, the optical drive simplifies the detection method. The present method maps out a zone located at the outside of the disc for reducing the recording speed. Before recording data, the optical drive moves the PUH to the outside of the disc and executes an OPC (optimum power calibration) to detect the quality of the signals. FIG. 17 shows a schematic diagram of the sixth embodiment of a method for controlling the recording speed of a multi-layered optical disc of the present invention. The present embodiment is a multi-layered disc 8 with two recording layers—a first recording layer 80 and a second recording layer 81. Each recording layer of the multi-layered disc is on a parallel track path (PTP). Before recording, the present embodiment divides the disc into three zones. There is a first zone Z81, a second zone Z82 and a third zone Z83. Only the third zone Z83 located at the outside of the disc is used for reducing the recording speed when the quality of the signals is bad.

After finishing the recording on the first recording layer 80, the PUH will jump to the second recording layer 81 and the switching locations of the zones of the second recording layer 81 refer to the ones of the previous recording layer, such as the switching locations of the zones of the second recording layer 81. As showed in FIG. 17, the recording speeds on the first recording layer 80 and the second recording layer 81 are also 4×, 6× and 4× from the inside to the outside.

Of course, the optical drive can increase the recoding speed when the quality of the recording layer is superior to the previous recording layer. But the zones still refer to the previous recording layer. So, when the quality of the second recording layer 81 is superior to the first recording layer 80, the recording speeds are 6×, 8× and 4× from the outside to the inside as shown in the parentheses of FIG. 17.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A method for controlling a recording speed of a multi-layered optical disc, wherein the multi-layered optical disc has a plurality of recording layers and each recording layer is on an opposite track path, the method comprising:
   dividing the multi-layered optical disc into a plurality of zones, wherein each recording layer has the same corresponding zones;
   determining the quality of the zones of the multi-layered optical disc;
   setting the recording speed for each zone, wherein the recording speed is determined according to the quality of each zone; and
   recording data on the multi-layered disc according to the recording speed and the zones,
   wherein an optical drive reduces the recording speed when it is on inferior quality zones and records data from the inside to the outside and increases the recording speed when it records data on the next recording layer from the outside to the inside and has passed the inferior quality zones, and the recording speed of a subsequent zone is faster than the recording speed of a previous recording zone.

2. The method for controlling the recording speed of a multi-layered optical disc of claim 1, wherein the optical drive has a table, and the table stores the recording speed of each zone and a switching location of each zone.

3. The method for controlling the recording speed of a multi-layered optical disc of claim 1, wherein the step of detecting the quality of the zones of the multi-layered optical disc is based upon a peak value of a tracking error.

4. The method for controlling the recording speed of a multi-layered optical disc of claim 1, wherein the step of detecting the quality of the zones of the multi-layered optical disc is based upon a peak value of a focus error.

5. The method for controlling the recording speed of a multi-layered optical disc of claim 1, wherein the step of detecting the quality of the zones of the multi-layered optical disc is based upon a jitter of a wobble signal.

6. The method for controlling the recording speed of a multi-layered optical disc of claim 1, wherein the step of detecting the quality of the zones of the multi-layered optical disc is moving a pick-up head to the outside of the disc to do an optimum power calibration and making a determination based upon the result.

7. The method for controlling the recording speed of a multi-layered optical disc of claim 1, wherein the step of detecting the quality of the zones of the multi-layered optical disc is determined by recognizing an ID of the disc manufacturer or an ID of the dye of the disc.

8. The method for controlling the recording speed of a multi-layered optical disc of claim 1, wherein the step of detecting the quality of the zones of the multi-layered optical disc is to detect the quality of each zone of the multi-layered disc by moving a pick-up head to each predetermined zone.

9. The method for controlling the recording speed of a multi-layered optical disc of claim 1, wherein the step of setting the recording speed for each zone is to set the recording speed of each zone and a switching location of each zone by referring to the previous recording layer.

10. The method for controlling the recording speed of a multi-layered optical disc of claim 2, wherein the optical drive modifies the recording speed of each zone and the switching location of each zone that are stored in the table according to the quality of the recording layer and provides it as a reference for recording data on the next recording layer.

* * * * *